Nov. 10, 1970    J. F. DURYEE    3,539,430

METHOD OF CONSTRUCTING A RADIO-FREQUENCY FEED-THROUGH ASSEMBLY

Filed Jan. 24, 1968

John F. Duryee,
INVENTOR.

BY

United States Patent Office 3,539,430
Patented Nov. 10, 1970

3,539,430
METHOD OF CONSTRUCTING A RADIO-FREQUENCY FEED-THROUGH ASSEMBLY
John F. Duryee, Bloomington, Minn., assignor, by mesne assignments, to the United States of America as represented by the Secretary of the Army
Filed Jan. 24, 1968, Ser. No. 700,237
Int. Cl. B32b 31/12
U.S. Cl. 156—294        1 Claim

ABSTRACT OF THE DISCLOSURE

A method of assembling a device, having the same geometric configuration as the transmission line to which it is attached, that transmits radio-frequency power through a vacuum barrier. The assembly is adaptable to different types of transmission line geometry and is elastic to reduce leakage caused by vibration or shock. A filler material is placed within a cylindrical tube having a mounting flange attached to one end, a waveguide is passed through the filler and the flange, and an uncured epoxy cement is applied to adjacent areas of the tubing, flange, filler, and waveguide to effect a seal. The assembly is then subjected to a high vacuum while the epoxy is cured.

BACKGROUND OF THE INVENTION

In transferring radio-frequency energy from a transmission line at normal atmospheric pressure to a system at high vacuum, neither energy losses nor pressure rises in the system are desirable. There are various feed-throughs which have good radio-frequency transmission but permit pressure rises due to poor sealing. There are also feed-throughs which, although maintaining good pressure seals, have loss of radio-frequency power transmission. Power transmission through a poor feed-through can result in considerable loss of power and generation of excessive heat in the feed-through, requiring greater radio-frequency generation to deliver the power to the load.

SUMMARY OF THE INVENTION

To overcome the inadequacy of these prior art feed-throughs, a method of assembling a simple radio-frequency feed-through is provided that offers low power losses and good pressure and vacuum sealing. Use of the present method of assembly allows the feed-through to have the same geometric configuration as the transmission line, therefore, only the housing of the vacuum system will influence transmission efficiency. The method of assembly is adaptable to different types of transmission line geometry. It results in more elastic feed-throughs being produced that are less subject to leakage from vibration or shock than other types of feed-throughs, and is readily adapted for cooling of the housing, if necessary.

DESCRIPTION OF THE PREFERRED EMBODIMENT

Figure 1:
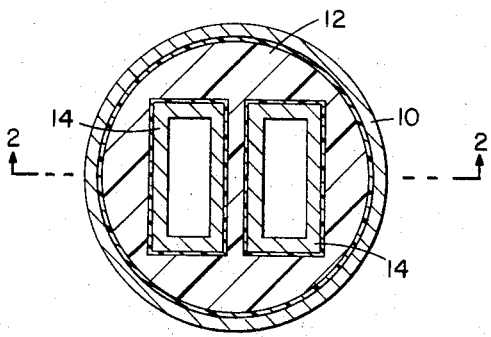
FIG. 1 shows a sectional view of a feed-through with the vacuum flange removed.
Figure 2:
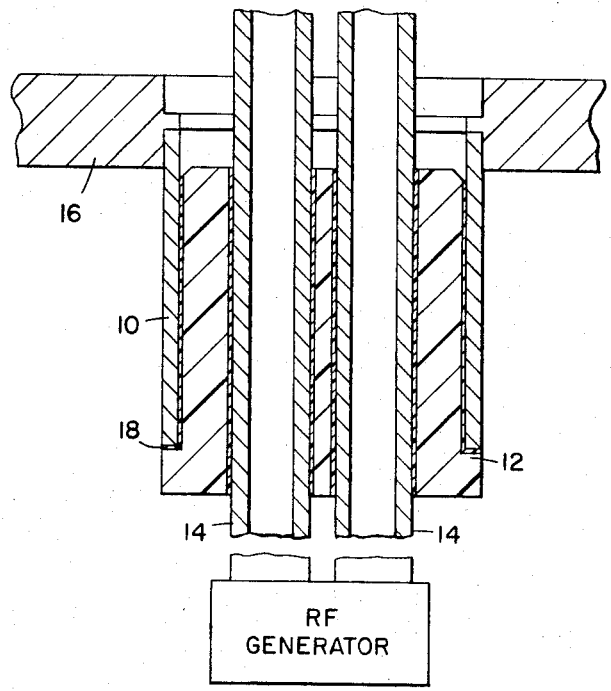
FIG. 2 shows a sectional view of a feed-through with the vacuum flange in place assembled in accordance with the inventive method.

Referring now to FIGS. 1 and 2 wherein like numbers refer to like parts, an embodiment of a feed-through made in accordance with the inventive method is shown, which utilizes waveguide for the transmission lines. The feed-through consists of a corrosive resistant steel tube 10, a filler 12, two rectangular, high-conductivity copper tubes (waveguide) 14, a high vacuum flange 16, and an epoxy sealant 18.

The assembly process for construction of the feed-through is as follows:

The tube 10 is attached (by welding or some other means) at one end to flange 16 and the filler 12 is inserted into tube 10 from the unflanged end. The aperture size and shape that is desired in both flange 16 and filler 12 are predetermined and located accordingly. The copper waveguide 14 is inserted in the apertures. An epoxy sealant 18 (equivalent to "Torr-Seal," Varian Associates) is applied to the mating surfaces during assembly and may cover as much surface as is necesary to effect a tight seal. The assembled unit is subjected to a high vacuum during a curing process, thereby actually pulling the epoxy into the pores and voids of the mating surfaces. Epoxy may be added during the curing process if leak paths develop.

Within the vacuum chamber the waveguide matches with a work coil or other terminal component. No matching network is involved in the feed-through which is effectively a part of the waveguide input.

In assemblies wherein high heat is generated by a work coil, or similar A-C energy induction device, purified water or other cooling liquids are circulated through the waveguide as a coolant.

Although a particular embodiment and form of this invention has been illustrated, it is understood that modifications may be made by those skilled in the art without departing from the scope and spirit of the foregoing disclosure.

I claim:

1. The method of constructing a radio frequency feed-through assembly having the same geometric configuration as a transmission line to which it is attached, said assembly disposed for transmitting radio frequency power through a vacuum barrier and including a cylindrical metal tube having a mounting flange, and waveguide tubing means for coupling power through the assembly, comprising the steps of:

forming a cylindrical filler material to fit the aperture of said cylindrical tube in snug fitting relation, providing an opening through said filler for receiving said waveguide means therein in snug fitting relation, coating said filler with an uncured epoxy cement around the interior peripheral surface and the external cylindrical surface thereof, inserting said filler into said cylindrical tube, inserting said waveguide means into said filler opening, and subjecting the assembled feed-through to a vacuum while curing said cement.

References Cited

UNITED STATES PATENTS

| | | | |
|---|---|---|---|
| 1,742,625 | 1/1930 | Weckerle | 156—293 |
| 3,201,296 | 8/1965 | Kilduff et al. | 156—330 |
| 3,232,815 | 2/1966 | Klopfenstein et al. | 156—320 |
| 3,258,379 | 6/1966 | Ponemon et al. | 156—285 |
| 3,341,024 | 9/1967 | Lowe et al. | 156—294 |
| 3,356,549 | 12/1967 | King | 156—294 |

FOREIGN PATENTS 461,478    2/1937    Great Britain.

REUBEN EPSTEIN, Primary Examiner

U.S. Cl. X.R.

29—592; 156—285